US007813727B2

(12) United States Patent
Ritter

(10) Patent No.: US 7,813,727 B2
(45) Date of Patent: Oct. 12, 2010

(54) PORTABLE RADIO RECEIVER WITH AN IDENTIFICATION MODULE

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 8 days.

(21) Appl. No.: 11/399,101

(22) Filed: Apr. 6, 2006

(65) Prior Publication Data

US 2006/0189307 A1 Aug. 24, 2006

Related U.S. Application Data

(60) Division of application No. 10/014,683, filed on Dec. 11, 2001, now Pat. No. 7,058,397, and a continuation of application No. PCT/CH99/00300, filed on Jul. 6, 1999.

(51) Int. Cl.
*H04M 3/00* (2006.01)
(52) U.S. Cl. ............... 455/419; 455/41.2; 455/420; 455/558
(58) Field of Classification Search ........... 455/419, 455/41.2, 420, 558, 411, 556.1, 556.2
See application file for complete search history.

(56) References Cited

U.S. PATENT DOCUMENTS

| | | | | | |
|---|---|---|---|---|---|
| 4,739,510 | A | * | 4/1988 | Jeffers et al. | 380/234 |
| 5,303,393 | A | * | 4/1994 | Noreen et al. | 455/3.02 |
| 5,627,549 | A | * | 5/1997 | Park | 701/300 |
| 5,721,781 | A | * | 2/1998 | Deo et al. | 705/67 |
| 6,018,649 | A | * | 1/2000 | Ruhl | 455/186.1 |
| 6,055,442 | A | * | 4/2000 | Dietrich | 455/558 |
| 6,118,789 | A | | 9/2000 | Wood, Jr. | 370/462 |
| 6,282,412 | B1 | * | 8/2001 | Lyons | 455/186.1 |
| 6,314,094 | B1 | * | 11/2001 | Boys | 370/352 |
| 6,424,845 | B1 | | 7/2002 | Emmoft et al. | 455/575.1 |
| 6,434,403 | B1 | * | 8/2002 | Ausems et al. | 455/556.2 |
| 6,483,930 | B1 | | 11/2002 | Musgrave et al. | 382/117 |
| 6,522,875 | B1 | * | 2/2003 | Dowling et al. | 455/414.3 |
| 7,031,272 | B2 | * | 4/2006 | Campanella | 370/316 |
| 2002/0003495 | A1 | * | 1/2002 | Johnstone et al. | 342/357.13 |

FOREIGN PATENT DOCUMENTS

| | | | |
|---|---|---|---|
| EP | 0 732 813 | A | 9/1996 |
| EP | 0 804 012 | A | 10/1997 |
| EP | 0 813 171 | A | 12/1997 |
| GB | 2 313 981 | A | 12/1997 |
| JP | 10-098706 | | 4/1998 |
| JP | 10/191284 | | 7/1998 |
| JP | 11-146057 | | 5/1999 |
| WO | WO 98 57482 | A | 12/1998 |
| WO | WO 98/58510 | | 12/1998 |
| WO | WO 99/28884 | | 6/1999 |

* cited by examiner

*Primary Examiner*—Barry W Taylor
(74) *Attorney, Agent, or Firm*—Pearne & Gordon LLP

(57) ABSTRACT

The portable radio receiver (4) with which programs of a central radio sender (1) can be received comprises an identification module (40) in which user-specific data are stored as well as a contactless interface (41) over which a radio connection can be established with external devices at close range in order to send said user-specific data to these external devices.

Application: for example as identification module for public transportation.

27 Claims, 4 Drawing Sheets

PORTABLE RADIO RECEIVER WITH AN IDENTIFICATION MODULE

REFERENCE DATA

This application is a divisional application of U.S. Ser. No. 10/014,683 (US20020090913) filed on Dec. 11, 2001 as a continuation of International Patent Application PCT/CH99/00300 (WO0103311) filed on Jul. 6, 1999, the contents whereof are hereby incorporated by reference.

FIELD OF THE INVENTION

The present invention concerns a portable radio receiver that can be used both for receiving multimedia data, for example an entertainment program, and as identification vis-à-vis external devices.

RELATED ART

As identification module, for example for public transportation, for ski lifts, for theaters or cinemas, different kinds of contactless identification modules have already been proposed. It is for example already known to integrate an RFID (Radio Frequency Identification) element into a chip-card or a wristwatch. User identification data, for example the user number, and authorization data, for example an authorization purchased for certain services, are stored in the RFID element. Appropriate readers at the places of use, for example at the doors of public transportation vehicles, can access these data contactlessly and, if appropriate, provide the service, for example open the vehicle's door, and possibly bill this service.

A disadvantage of this kind of identification module is that there is no easy and convenient method for downloading new data, for example a new authorization, or new programs, for example new functions or new services, in an identification module. The user must in most cases personally go with his module to a counter and to a machine in order to copy new data into his module. This strongly restricts the possible uses of such identification modules. Another disadvantage is that service providers have no easy means of blocking a certain identification module, for example if the module is stolen or after a fraudulent act. The blocking can only occur when the module is inserted into a corresponding device.

SIM (Subscriber Identification Module) cards for mobile telephones having also a contactless interface are already known. In this manner, the mobile network user identification stored in the card can also be used to identify the user vis-à-vis external devices. New data can be downloaded over the mobile radio channel. Such a data transmission occurs however through the establishment of a payable connection or a SMS transmission, and with a limited bandwidth, so that this solution is not adapted for all purposes.

It is an aim of the present invention to propose a new and improved identification module.

In particular, it is an aim of this invention to propose a new identification module in which data from a remote sender, for example data from a service provider, can be downloaded and in which user-specific data are stored that can be transmitted over a contactless interface to external devices at short range (up to several meters).

BRIEF SUMMARY OF THE INVENTION

According to the present invention, these aims are achieved in particular through the characteristics of the independent claims. Further advantageous embodiments are moreover described in the dependent claims and in the description.

In particular, these aims of the invention are achieved through the identification module having a contactless interface and being integrated in a portable radio receiver. If the radio receiver is a digital radio receiver, for example a DAB or DVB radio receiver, new data and/or programs can then be downloaded in the identification module as program-accompanying data. The identification module can furthermore be used to receive and reproduce a radio program, for example an entertainment program or program-accompanying Internet data.

The contactless radio interface allows a data transmission over short distances (so-called "short distance wireless RF transmission"), typically up to several meters. It preferably uses a standardized protocol and standardized frequencies. In this manner, different radio receivers can communicate over this channel with one another or with other devices, for example with palmtops, laptops, external printers, mobile telephones etc. For example, the radio receiver comprises a contactless interface according to the Bluetooth or HomeRF standard. In a variant embodiment, the radio receiver comprises a RFID element operating according to a known RFID protocol.

Patent document GB2313981 describes a DAB (Digital Audio Broadcasting) radio receiver combined with a mobile radio part (GSM receiver). The device can thus receive data, in particular Internet data, as well as DAB program-accompanying data, and has a reverse GSM channel in order to send data in the other direction. It is however not planned to provide the receiver with an identification module and with a contactless interface for close range.

EP804012 describes a DAB receiver that is connected over a local interface (RS232, infrared or radio) with a mobile device. This device can however not send user-specific data to external devices at close range and can thus not be used as identification element vis-à-vis external devices at close range.

EP732813 describes a FM radio receiver with a chip-card in which user-specific data are stored. The receiver includes no contactless interface at close range and can thus also not be used as identification element.

In a preferred embodiment, the identification module includes biometric parameters of the user of the identification module. For example, the module includes a photograph of the user that can be transmitted over the contactless interface. In this manner, a controller can check whether the user of the identification module is indeed the rightful owner.

In a preferred embodiment, the radio receiver is miniaturized and integrated for example in a chip-card, in a wristwatch, in a key ring, in a mobile telephone or in a component of a mobile telephone (set of batteries, replaceable module etc.).

The identification module preferably comprises input means, for example a keyboard and/or a touch screen, with which data can be entered. Chip-cards with a keyboard are described among others in patent application EP0813171. In this manner, confirmations to debit a money account can be entered and forwarded over said contactless interface. Certain identification modules, for example stolen ones, can also be blocked in this way.

DESCRIPTION OF THE DRAWINGS

Preferred embodiments of the invention will be described hereafter in more detail with the aid of the attached drawings, in which.

DETAILED DESCRIPTION OF THE INVENTION

Figure 1:
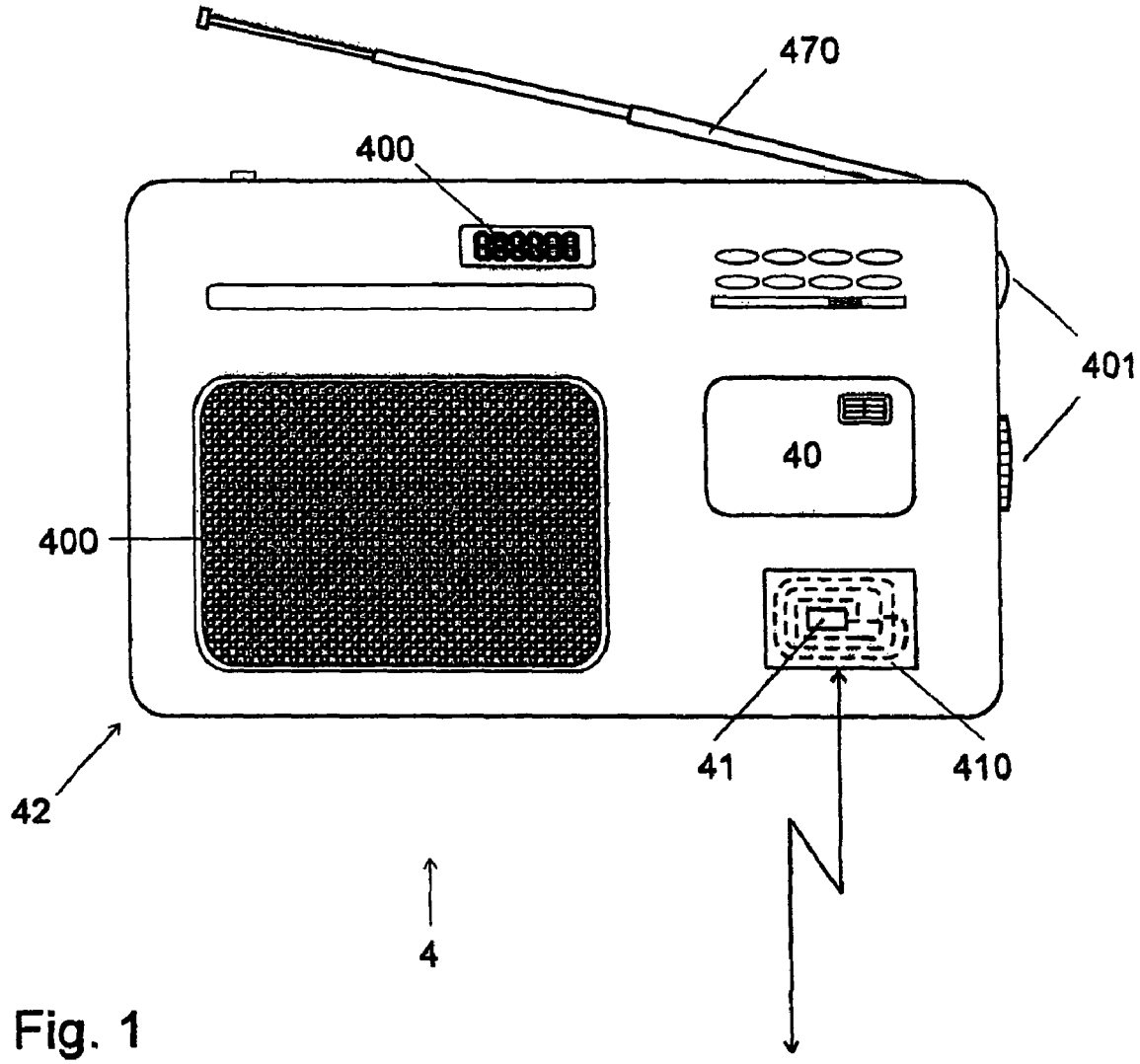
FIG. 1 shows a diagrammatic view of an identification module, in this embodiment in the form of a portable radio receiver.

FIG. 1 shows diagrammatically a radio receiver 4 according to the invention, in this example accommodated in a larger housing 42, in which an identification module 40 with user-specific data is integrated. The radio receiver comprises reception means (not represented, No. 46 in FIG. 2) with which an analog or digital radio program of a remote sender can be received, and reproduction means 400 in order to reproduce this program. In the represented example, the reproduction means 400 consist only of a loudspeaker and of a simple liquid crystal display. The radio receiver could however have a better matrix screen, for example a LCD and/or preferably a VRD (Virtual Retina Display) with which animated images and WEB pages can be represented. In a preferred embodiment of the invention, the radio receiver is a DAB (Digital Audio Broadcasting) or DVB (Digital Video Broadcasting) receiver that can also receive and reproduce visually and/or acoustically multimedia data, including motionless and animated images, applets, sound, hypertext documents etc., for example as program-accompanying data.

The radio receiver additionally has input means 401, for example simple keys as in the represented example, a so-called touch-screen that is operated with a pen, a microphone with a speech-analyzing program, and/or a device for determining the position of the eye. With these input means, the user can control the reception of radio programs and the communication with external devices. The radio receiver 42 furthermore has its own energy supply means (not represented), for example a battery or solar cells.

The radio receiver 42 can be used as means of identification and authorization in order to access various services with external devices at close range. This description shows in detail the example of the checking of tickets in a public transportation vehicle, although the radio receiver according to the invention can also be used to authorize the access to other services, for example admission tickets for cinemas, theaters, exhibitions etc., for checking driver's licenses, for ski lifts etc.

According to the invention, the radio receiver 42 includes a contactless interface 41 over which a radio connection at close range (typically up to a maximum of 20 meters) can be established. The contactless interface comprises preferably a chip 41, for example a RFID chip, and an antenna 410. The chip comprises a radio part and data processing means and can send and receive data in a defined frequency range, for example in an ISM (Industrial Scientific and Medical Applications) range or in a frequency range between 2.4 to 2.5 GHz. Depending on the frequency used, the antenna 410 can also be integrated in the chip or consist of a wound coil.

The identification module 40 consists for example of a removable chip-card, for example a SIM (Subscriber Identification Module) card. In this manner, for example an authorization, for example a ticket, can be sold in the form of a chip-card that the users need only insert into their terminal. Alternatively, user-specific data can also be stored in a secured storage area (virtual SIM card) of the radio receiver 4.

The user-specific data stored in the identification module 40 include for example the user's identification and authorization data. The user's identification data comprise preferably the user's identity, for example his name and/or user number. If the identification module 40 can also be used as a SIM (Subscriber Identification Module) card in a mobile radio network, the user's identity can also consist of his IMSI (International Mobile Subscriber Identification) number. In a variant embodiment, the identification data comprise also biometric parameters of the user, for example a photograph, voice parameters, iris and/or retina parameters, a finger print etc. With these biometric parameters, it can be reliably determined whether the user of the identification module is also the rightful owner.

Depending on the application, the authorization data can include different types of data. If the identification module 40 is used for identifying passengers in public transportation, the authorization data comprise for example the type and validity of the user's ticket or season ticket, his seat bookings, possible blocking data if the season ticket has been blocked etc.

The contactless interface 41 preferably allows a bi-directional data transfer with external devices. Preferably, a standardized protocol is used for this interface, for example the Bluetooth or HomeRF standard, so as to make possible a communication with standardized terminals 42. The contactless interface 41 can however also consist of a RFID (Radio Frequency Identification) element. According to the embodiment, the radio receiver 42 has its own energy supply means, for example a battery or solar cell, or can be powered by external devices.

Figure 2:
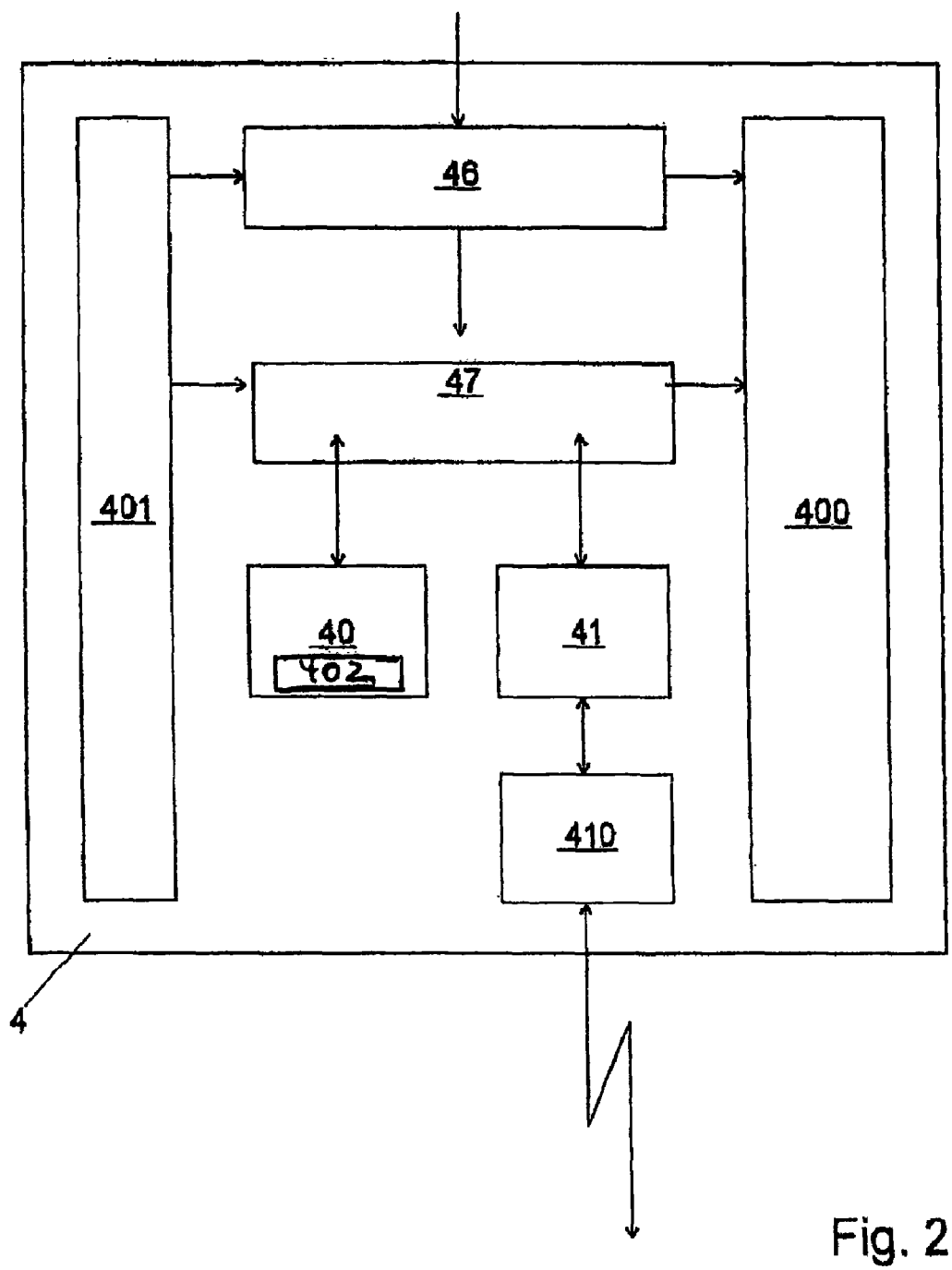
FIG. 2 shows a block diagram of the radio receiver.

FIG. 2 shows a functional block diagram of a radio receiver 4 according to the invention. The radio receiver includes control elements 401, reproduction means 400, a radio part 46, data processing means 47, an identification module 40 and a contactless interface 41 with an antenna 410 for contactless data transmission at close range. Identification and authorization data are stored in a storage area 402 of the identification module 40; these data can be read resp. modified with the control elements 401, with program-accompanying data received by the radio part 46 and/or by an external device over the contactless interface. In the framework of this invention, other components can also be integrated in the radio receiver 4, for example a location-determining receiver, for example a GPS receiver, and/or a radio part, for example a GSM or UMTS mobile radio part.

The data processing means 47 can preferably process or execute data, applets or other programs received by the radio part 46, and control correspondingly the functions of the identification module 40 and of the communication part 41. Preferably, the identification module 40 also has its own data processing means with which it can process received data and programs. In this manner, for example new authorizations or modifications in the identification data can be downloaded.

The data processing means preferably include a filter, for example a software filter. With this filter, selected data in the received data flood can be filtered and then processed. The filter can preferably be set by the user according to his interest and taste. Preferably, at least one service provider, for example the service provider who has provided the identification module 40, can also set the filter. The filter allows for example for personal messages to be sent in broadcast mode to all recipients but to be received, stored and possibly processed only by the recipient indicated in the message. In this manner, for example blocking data for blocking a certain or a list of identification modules can be sent by a central sender, for example a DAB sender. These blocking data are received by all recipients, but only retained by the filters in the designated modules, so that authorization data can be blocked in certain radio receivers addressed.

If the radio receiver includes location-determining means, for example a GPS receiver, the filter function can preferably depend on the user's current location. In this manner, a broadcast sender sending data in all directions can send location-dependent information and program-accompanying data.

The user-specific data stored in the identification module 40 preferably comprise the user's identification data, for example his name, his user number of, if the module can also be used as a SIM card for a mobile telephone, his IMSI (International Mobile Subscriber Identification) number. In a preferred embodiment, the user's identification data additionally comprise an electronic certificate with which sent messages can be signed. With this certificate, data coded with an asymmetrical encryption algorithm can be transmitted to service providers and external devices without security risk.

In a preferred embodiment of the invention, the identification data include biometric parameters of the user, for example a photograph of the user. The user of an external device, for example a ticket controller in a train, can access these data over the contactless interface, for example he can have the stored photograph of the user displayed to him and can thus check whether the user of the radio receiver is also the rightful owner of the identification module.

The user-specific data can comprise authorization data, for example the authorization for using an external device. Depending on the application, the authorization data can include different types of data. If the identification module 40 is used for identifying passengers in public transportation, the authorization data comprise for example the type and validity of the user's ticket or season ticket, his seat bookings, possible blocking data for blocking a certain authorization in the identification module etc.

Figure 3:
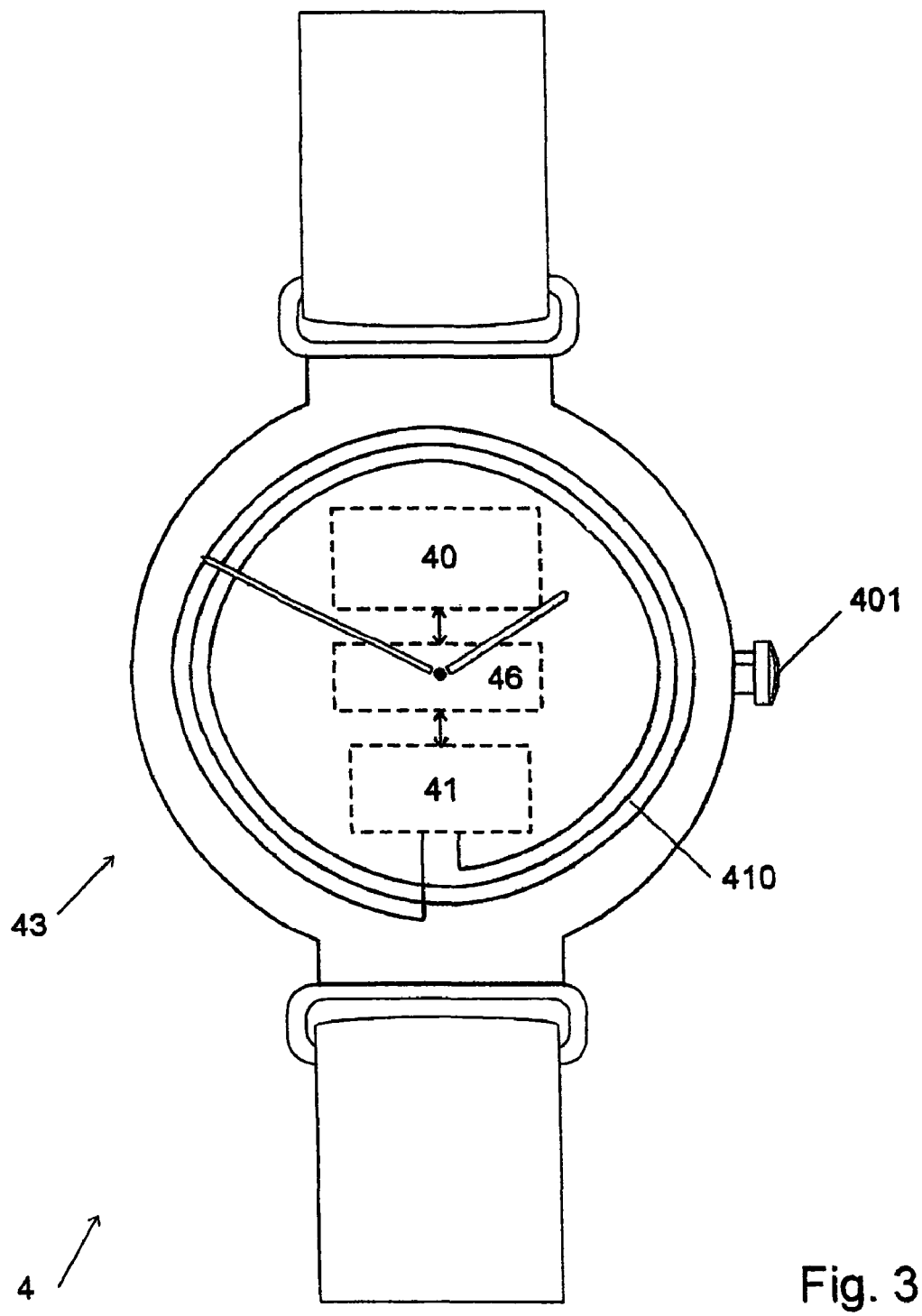
FIG. 3 shows a diagrammatic view of an identification module, in this embodiment in the form of a wristwatch.

FIG. 3 shows another embodiment of the invention, in which the radio receiver is integrated in a wristwatch 43. In this case, the radio receiver has only limited controls, for example a limited number of keys, and simple reproduction means, for example a LCD or VRD (not represented), with which the data and program-accompanying data received over the radio part 46 can be reproduced. The identification module 40 is preferably devised as storage area in the data processing means (not represented); the contactless interface consists for example of a RFID chip 41 with an antenna 410 in the watch case, in the wristband or in the bezel.

In a variant embodiment of the invention (not represented), the radio receiver could also be integrated in a chip-card or in another portable and electrically autonomous device, for example in a palmtop, in a laptop, in a key ring etc.

Figure 4:
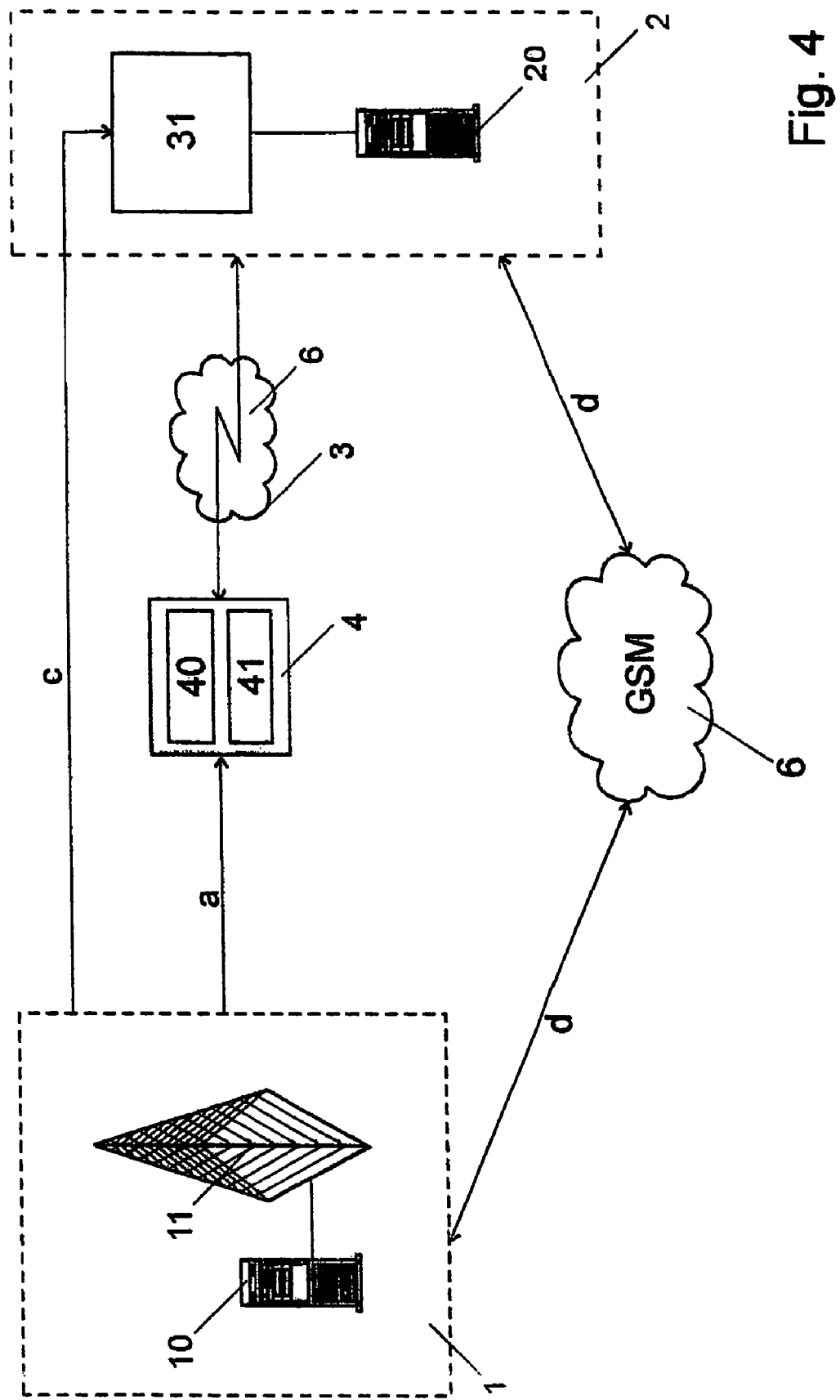
FIG. 4 shows a diagrammatic view of a system in which the radio receiver according to the invention can be used.

FIG. 4 shows by way of example a diagrammatic view of a system in which the radio receiver 4 according to the invention can be used. The radio receiver 4 with an identification module 40 can in this system receive data, for example program-accompanying data, from an external sender, for example from a DAB or DVB sender 1 (arrow a), the sender 1 comprising transmission means 11 and program-preparing means 10. The radio receiver 4 has a contactless interface 41 over which it can communicate at close range (typically up to 20 meters) with external devices 2 (arrow b). The interface preferably uses a standardized interface, for example a Bluetooth, HomeRF or RFID interface, so that the radio receiver can communicate with a plurality of different external devices of various types. Some of these devices can also have a radio part with which they can receive data from the sender 1 (arrow c).

The external device also has a contactless interface 31 and data processing means 20, in the represented example a computer. The external device can be portable and be used for example by a ticket controller in a public transportation vehicle in order to check the passengers' identity and authorization. In another variant embodiment, the external device consists of a computer 20 in a vehicle, connected over a data bus (not represented) with a plurality of transceivers in the vehicle, so that the computer 20 can access the user-specific data of all passengers in the vehicle.

The external device 2 can comprise another communication part, for example a mobile radio part, over which it can exchange data in both directions with other devices, among others with the server 10 of the sender 1 (arrow d).

The invention claimed is:

1. A portable radio receiver comprising:
a housing for accommodating said receiver,
reception means for receiving a digital radio or video program, including program accompanying data, which is sent in broadcast mode by a central radio or video sender,
an identification module of a mobile radio network accommodated in said housing, in which user-specific data including authorization data are stored, and
data processing means, including a software filter, for filtering user specific information which indicate the user as recipient from the program accompanying data such that only the user specific information which indicate the user as recipient are processed by said portable radio receiver.

2. The portable radio receiver of claim 1, wherein said user-specific data includes an electronic certificate.

3. The portable radio receiver of claim 1, wherein said filter allows for messages to be sent in broadcast mode to a plurality of recipients but to be processed only by the recipient indicated in the messages.

4. The portable radio receiver of claim 1, comprising satellite based location determination for determining the user's current location, wherein said filter depends on said user's current location.

5. The portable radio receiver of claim 1, further comprising means for changing the content of said identification module depending on said program accompanying data.

6. The portable receiver of claim 1, comprising data processing means for executing one or both of applets or programs contained in said program-accompanying data.

7. The portable radio receiver of claim 1, wherein said user-specific data comprise authorization data of the user for using external devices, and wherein said authorization data can be modified with program-accompanying data.

8. The portable radio receiver of claim 1, with which a DAB and/or DVB program including program accompanying data can be received.

9. The portable receiver of claim 1, in which biometric parameters of the user are stored in the identification module.

10. The portable radio receiver of claim 9, said biometric parameters including at least one of the items of the group consisting of: a photograph, voice parameters, iris parameters, retina parameters, and finger parameters.

11. The portable radio receiver of claim 1, in which the identification module is removable.

12. The portable radio receiver of claim 1, in which the program-accompanying data comprises authorization data for accessing a service.

13. The portable radio receiver of claim 12, in which the service comprises one or more of the following: tickets for public transportation vehicles, cinemas, theatres, exhibitions, ski-lifts and/or a driver license.

14. The portable radio receiver of claim 1, such that the user specific information that is processed provides the user with access to personal messages directed to the user that are included with said program accompanying data.

15. A method for selectively blocking a user identification module of a mobile radio network, comprising the steps of:
sending blocking data as program accompanying data in a digital audio or video program sent in broadcast mode for simultaneous reception by a plurality of portable radio or video receivers;
receiving said blocking data including an indicated recipient by a plurality of radio or video receivers in which identification modules are removably connected;
filtering in said receivers blocking data so as to only retain blocking data in the addressed radio or video receiver of the indicated recipient;
blocking identification modules in said addressed radio receiver of the indicated recipient.

16. A portable radio receiver comprising:
a housing for accommodating said receiver,
a digital radio receiver for receiving a digital radio or video program including program accompanying data which is sent in broadcast mode by a central radio or video sender,
an identification module of a mobile radio network accommodated in said housing, in which authorization data are stored, and
a filter for filtering information from the program accompanying data based on said authorization data and also based on settings provided by the user such that only the information which indicates the user as recipient is processed by said portable radio receiver.

17. The portable radio receiver of claim 16, wherein data filtered from said program accompanying data is used to modify data stored in said identification module.

18. The portable radio receiver of claim 16, further comprising a location-determining receiver for determining the user's current location, wherein the output of said filter also depends on said user's current location.

19. The portable radio receiver of claim 16, wherein said information which indicates the user as a recipient includes personal messages directed to the user that are included in said program accompanying data.

20. The portable radio receiver of claim 16, further comprising a location determining receiver for determining a location of said radio receiver, wherein said filter also filters said information from said program accompanying data based on said location.

21. A portable radio receiver comprising:
a housing for accommodating said receiver,
a digital radio receiver for receiving a digital radio or video program including program accompanying data which is sent in broadcast mode by a central radio or video sender,
a software filter for filtering information from the program accompanying data based on settings provided by the user such that only the information which indicates the user as recipient is processed by said portable radio receiver.

22. The portable radio receiver of claim 21, wherein said information which indicates the user as a recipient includes personal messages directed to the user that are included in said program accompanying data.

23. The portable radio receiver of claim 21, further comprising a location determining receiver for determining a location of said radio receiver, wherein said filter also filters said information from said program accompanying data based on said location.

24. A portable radio receiver comprising:
a housing for accommodating said receiver,
a digital radio receiver for receiving a digital radio or video program including program accompanying data that includes blocking data indicating intended recipients which is sent in broadcast mode by a central radio or video sender,
an identification module of a mobile radio network accommodated in said housing, in which authorization data are stored, and
a filter for filtering said blocking data from the program accompanying data based on said authorization data such that blocking data is retained for only the intended recipients of blocking data, wherein
said portable radio receiver blocks authorization data from the identification module for the intended recipients.

25. A portable radio receiver comprising:
a housing for accommodating said receiver,
a digital radio receiver for receiving a digital radio or video program including program accompanying data which is sent in broadcast mode by a central radio or video sender,
a short-range radio receiver for connecting to an external device,
an identification module accommodated in said housing, in which authorization data are stored, and
a filter for filtering information from the program accompanying data based on said authorization data and also based on any of settings provided by the user or a location of said portable radio receiver, such that said information filtered from said program accompanying data is used to send information to said external device.

26. The portable radio receiver of claim 25, wherein said information sent to said external device includes an authorization for a user to obtain access to a service.

27. A portable radio receiver comprising:
a housing for accommodating said receiver,
a digital radio receiver for receiving a digital radio or video program including program accompanying data that includes blocking data indicating intended recipients which is sent in broadcast mode by a central radio or video sender,
an identification module, accommodated in said housing, in which authorization data authorizing a user to obtain a service are stored, and
a software filter for filtering said blocking data from the program accompanying data based on said authorization data such that blocking data is retained for only the intended recipients of blocking data, wherein
said portable radio receiver blocks authorization data from the identification module for the intended recipients.

* * * * *